United States Patent
Minase et al.

[11] Patent Number: 6,081,485
[45] Date of Patent: Jun. 27, 2000

[54] OPTICAL DISC ACCESSING APPARATUS CAPABLE OF PREVENTING ERROR IN THE MIRROR SIGNAL

[75] Inventors: Minoru Minase, Iruma; Toru Miura, Chofu; Hiroyuki Onda, Higashikurume; Junichi Kanenaga, Tanashi, all of Japan

[73] Assignee: Teac Corporation, Tokyo, Japan

[21] Appl. No.: 09/189,969

[22] Filed: Nov. 10, 1998

[30] Foreign Application Priority Data

Nov. 14, 1997 [JP] Japan ................... 9-313598

[51] Int. Cl.[7] .................................................. G11B 17/22
[52] U.S. Cl. ........................................ 369/33; 369/124.15
[58] Field of Search .................................. 369/32, 44.29, 369/44.28, 44.25, 44.26, 58, 124.01, 50, 275.3, 33, 124.15

[56] References Cited

U.S. PATENT DOCUMENTS

| | | | |
|---|---|---|---|
| 5,325,346 | 6/1994 | Hasegawa et al. | 369/44.28 |
| 5,563,856 | 10/1996 | Kim | 369/32 |
| 5,841,739 | 11/1998 | Iida et al. | 369/32 |
| 5,841,751 | 11/1998 | Komazaki et al. | 369/59 |
| 5,953,305 | 9/1999 | Jeong | 369/124 |
| 5,963,516 | 10/1999 | Hashimoto et al. | 369/44.29 |
| 5,974,010 | 10/1999 | Sakanushi | 369/44.41 |

FOREIGN PATENT DOCUMENTS 08115574   5/1996   Japan .

*Primary Examiner*—Tan Dinh
*Attorney, Agent, or Firm*—Ladas & Parry

[57] ABSTRACT

An optical disc apparatus prevents an occurrence of an error in the mirror signal due to a change in a reproducing speed or usage of different kinds of optical discs. A mirror circuit generates a mirror signal by comparing a level of a bottom signal with a level of a reference level signal. The bottom signal is detected from a reflection signal obtained by optically scanning the optical disc. A reference level control circuit generates a reference level control signal based on the reproducing speed. A reference level signal setting circuit sets a level of the reference level signal in accordance with the reference level control signal.

5 Claims, 8 Drawing Sheets

FIG. 1 PIOR ART

OPTICAL DISC ACCESSING APPARATUS CAPABLE OF PREVENTING ERROR IN THE MIRROR SIGNAL

BACKGROUND OF THE INVENTION

1. Field of the Invention

The present invention relates to an optical disc apparatus and, more particularly, to an optical disc apparatus reproducing information recorded on the optical disc.

2. Description of the Related Art

Generally, an optical disc apparatus is provided with a mirror circuit for detecting movement of an optical pickup between tracks formed on an optical disc. The mirror circuit is used for counting a number of tracks crossed by the optical pickup when a seek operation is performed so as to move the optical pickup to a target track.

FIG. 1 is a circuit diagram of a mirror circuit of a conventional optical disc apparatus. In the mirror circuit shown in FIG. 1, an RF signal reproduced from an optical disc is provided to an automatic gain control circuit (AGC) 24. A level of the RF signal is adjusted by the AGC circuit 24 as shown in FIG. 2-(A), and is provided to a bottom detecting unit 26.

The bottom detecting unit 26 holds minimum values of the RF signal shown in FIG. 2-(A), that is, the bottom detecting unit 26 performs a bottom-hold so as to detect a bottom signal shown in FIG. 2-(B). The bottom-hold is performed with a time constant so that the bottom-hold can be performed even when a traverse is performed at a high speed. The bottom signal is inverted by an inverting amplifier 28 with respect to a reference level signal so as to detect an amplitude change signal shown in FIG. 2-(C). The reference level signal is provided from a first fixed reference level signal source 22. The amplitude change signal is compared with another reference level signal provided by a second reference level signal source 32 by a comparator 30, the reference level signal having a level that is 60% of that of the amplitude change signal. Thereby, a mirror signal shown in FIG. 2-(D) is generated. The mirror signal is at a low level when an optical pickup aligns with a disc track, and is at a high level when the optical pickup is at a position between tracks or a defect is detected.

In the mirror circuit, a level of the bottom signal changes in association with changes in a reproducing speed such as a standard reproducing speed or a double reproducing speed. For example, when a reproducing speed is increased, amplitude of the RF signal is decreased.

As a result, a level of the amplitude change signal is decreased as shown in FIG. 2-(E). Accordingly, the reference level signal provided by the second reference level signal source 32 cannot corresponds to 60% of maximum amplitude of the amplitude change signal. Thus, a width of a pulse of the mirror signal is changed as shown in FIG. 2-(F). In the worst case, a pulse cannot be generated, which results in undetection of a traverse.

In a recordable optical disc such as a CD-R, dispersion may occur for each apparatus writing an optical disc. Accordingly, when information recorded on the optical disc is reproduced, dispersion may occur in the bottom signal in response to recorded portions written by different apparatuses. In such a case, the above-mentioned problem may also occur. Additionally, a dispersion may also occur in the level of the bottom signal when a CD-ROM (Compact Disc Read Only Memory) or a DVD (Digital Video Disc) is compatibly reproduced, which results in the above-mentioned problem.

SUMMARY OF THE INVENTION

It is a general object of the present invention to provide a novel and useful optical disc apparatus in which the above-mentioned problems are eliminated.

A more specific object of the present invention is to provide an optical disc apparatus which prevents an occurrence of an error in the mirror signal due to a change in a reproducing speed or usage of different kinds of optical discs.

In order to achieve the above-mentioned objects of the present invention, there is provided according to the present invention an optical disc apparatus reproducing information recorded on an optical disc, comprising:

a mirror circuit generating a mirror signal by comparing a level of a bottom signal with a level of a reference level signal, the bottom signal being detected from a reflection signal obtained by optically scanning the optical disc;

a reference level control circuit for generating a reference level control signal; and a reference level signal setting circuit for setting a level of the reference level signal in accordance with the reference level control signal.

According to the above-mentioned invention, the reference level signal is set to an appropriate level in response to the reference level control signal. Thus, an appropriate reference level signal is always generated, and an accurate mirror signal can be obtained.

In the optical disc apparatus according to the present invention, the reference level control circuit may generate the reference level control signal in accordance with a reproducing speed of the information on the optical disc.

Accordingly, since the reference level control signal for setting the reference level signal can be generated in accordance with a change in the reproducing speed, a response can be made to a change in a level of the amplitude change signal caused by a change in the reproducing speed.

Additionally, in the optical disc apparatus according to the present invention, the reference level control circuit may generate the reference level control signal when a retry of a seek operation is performed due to an occurrence of a seek error.

Accordingly, since the reference level control signal for setting the reference level signal is generated when a retry is performed due to a seek error, a response can be made to a seek error caused by generation of an inaccurate mirror signal.

Additionally, in the optical disc apparatus according to the present invention, the reference level control circuit generates the reference level control signal so that a level of the reference level signal generated when a seek operation is performed is changed from that generated when an ordinary reproducing operation is performed.

Accordingly, the mirror signal can be appropriately generated even if a shift in the bottom signal occurs due to fluctuation in the RF signal when a reproducing operation is performed.

Further, in the optical disc apparatus according to the present invention, the reference level control circuit may generate the reference level control signal for setting the reference level signal in accordance with a type of the optical disc when an operation of the optical disc apparatus is started.

Accordingly, an influence of difference in formation of the pits on the optical disc due to difference in types of the optical discs can be eliminated.

Other objects, features and advantages of the present invention will become more apparent from the following detailed description when read in conjunction with the accompanying drawings.

DETAILED DESCRIPTION OF THE PREFERRED EMBODIMENT

A description will now be given, with reference to the drawings, of an embodiment of the present invention.

Figure 1:
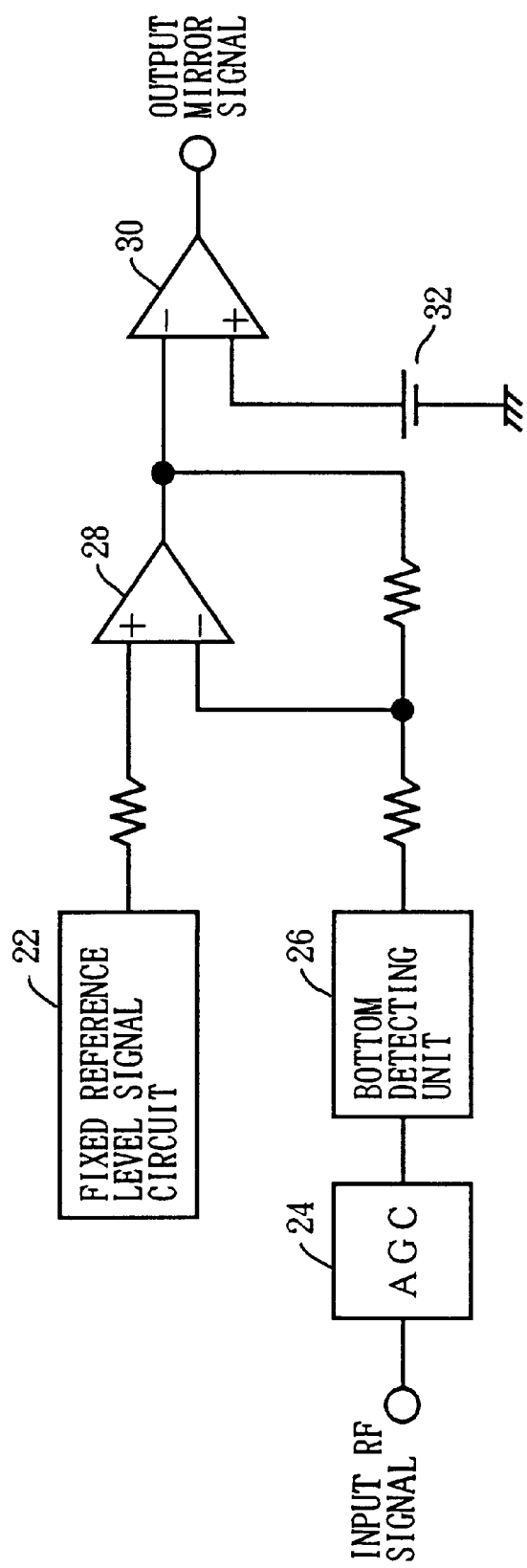
FIG. 1 is a structure diagram of a mirror circuit provided in a conventional optical disc apparatus.
Figure 3:
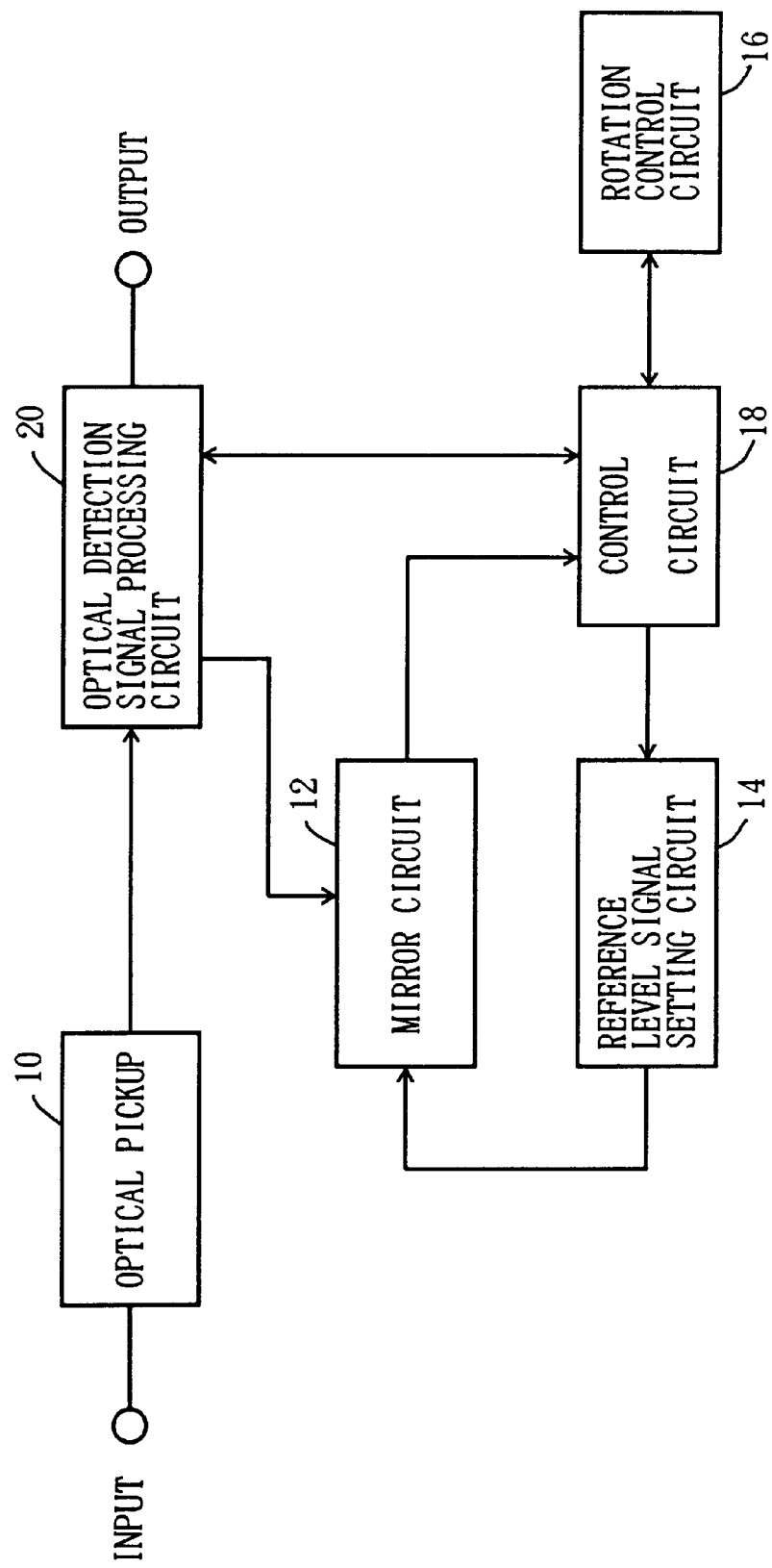
FIG. 3 is a block diagram of an optical disc apparatus according to an embodiment of the present invention.

FIG. 3 is a structure diagram of a mirror circuit according to an embodiment of the present invention. In FIG. 1, an optical pickup 10 reads pits formed on an optical disc so as to generate an optical detection signal (RF signal). The generated RF signal is provided to an optical detection signal processing circuit 20. A mirror circuit 12 outputs a mirror signal at a low level based on the RF signal provided by the optical detection signal processing circuit. Additionally, the mirror circuit 12 outputs the mirror signal at a high level when an optical pickup is between tracks or a defect is detected. The mirror signal is provided to a control circuit 18.

The controller 18 is provided with the mirror signal 18 from the mirror circuit 12 and also a rotation control signal provided form a rotation control circuit 16 which controls a rotational speed of the optical disc. The control circuit 18 generates a reference level control signal based on the above-mentioned two signals, and provides the reference level control signal to the reference level signal setting circuit 14. The reference level signal setting circuit 14 comprises a D/A converter.

The reference level setting circuit 14 (reference level signal setting means) generates a reference level signal used by the mirror circuit 12 in accordance with the reference level control signal provided by the control circuit 18, and provides the reference level signal to the mirror circuit 12.

Figure 4:
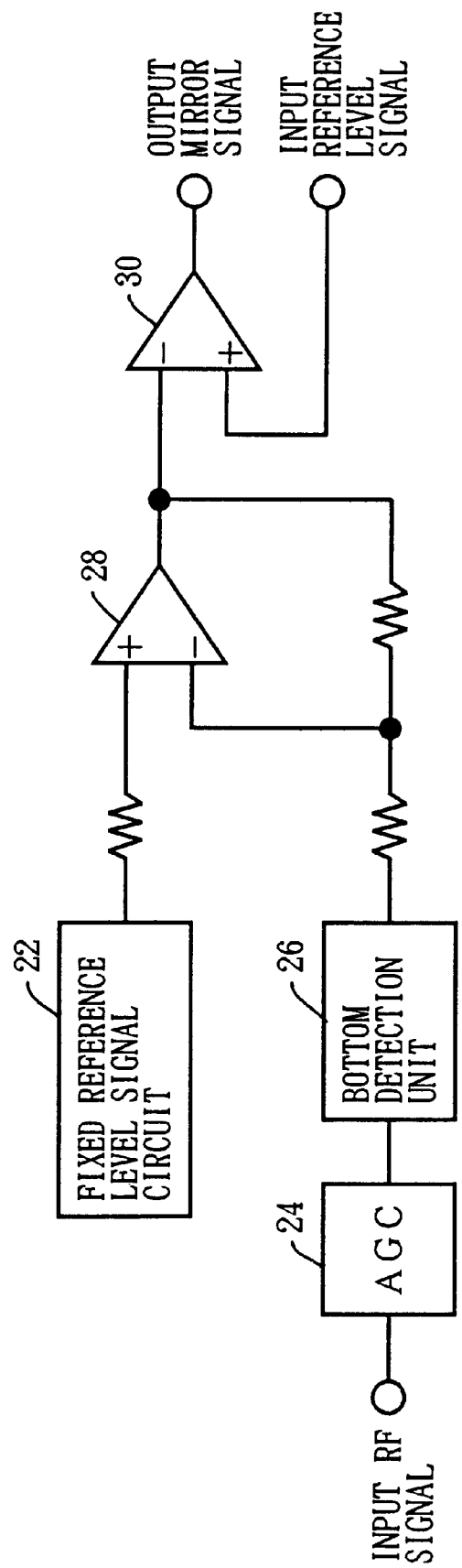
FIG. 4 is a circuit diagram of a mirror circuit shown in FIG. 3.

FIG. 4 is a structure diagram of the mirror circuit 12 according to the present invention. In FIG. 4, parts that are the same as the parts shown in FIG. 1 are given the same reference numerals. In the mirror circuit 12 shown in FIG. 4, a level of an RF signal provided by the optical detection signal processing circuit 20 is adjusted by the AGC circuit 24, and the RF signal as shown in FIG. 2-(A) is provided to the bottom detecting unit 26.

Figure 2:
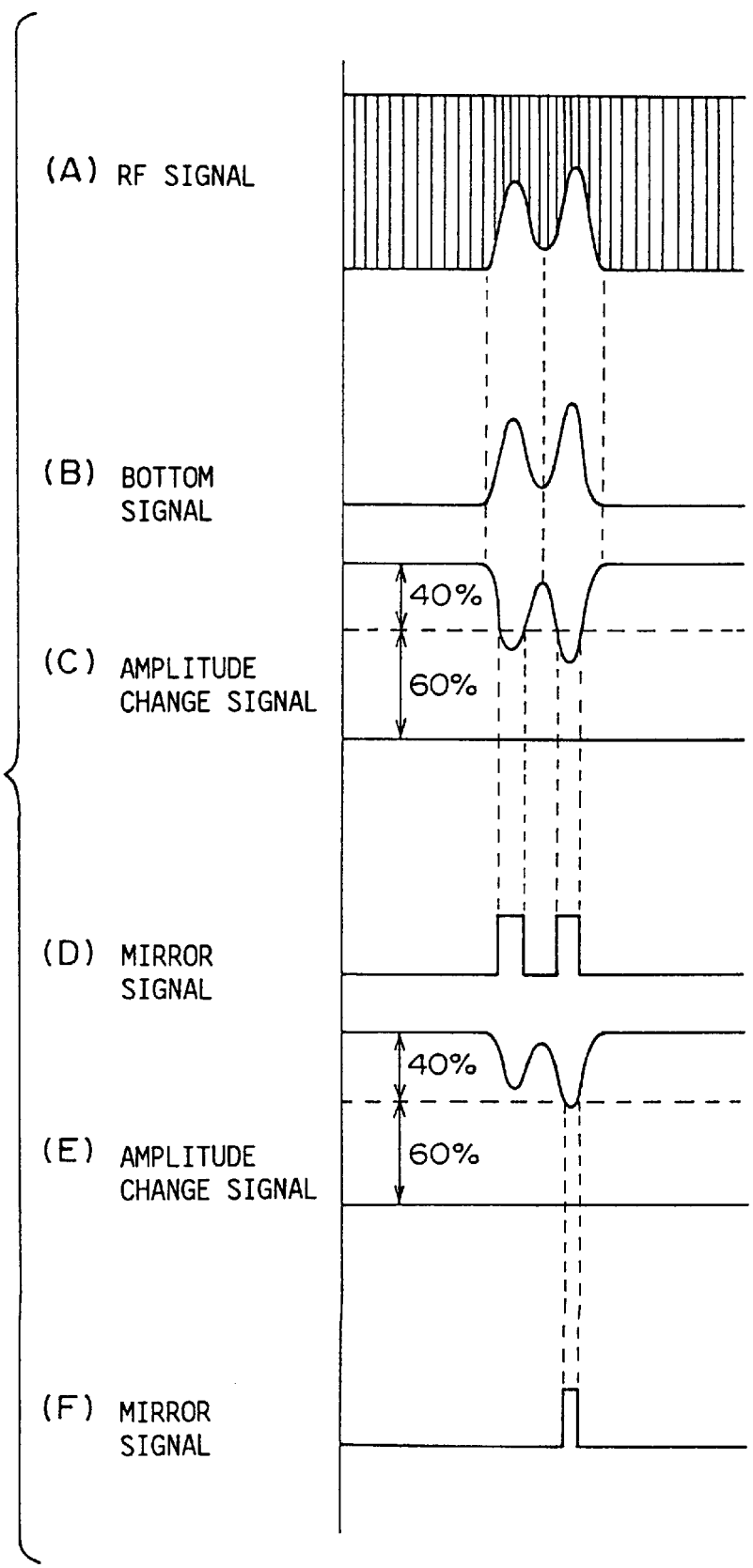
FIG. 2 is a waveform chart of signals in the mirror circuit shown FIG. 1.

The bottom detecting unit 26 holds minimum values of the RF signal shown in FIG. 2-(A), that is, the bottom detecting unit 26 performs a bottom-hold so as to detect a bottom signal shown in FIG. 2-(B). The bottom-hold is performed with a time constant so that the bottom-hold can be performed even when a traverse is performed at a high speed. The inverting amplifier 28 inverts and amplifies the bottom signal with respect to the reference level signal provided by the first reference level signal source 22. Accordingly, the amplitude change signal shown in FIG. 2-(C) is detected.

The reference level signal is provided to a noninverting terminal of the comparator 30 from the reference level signal setting circuit 14. Thereby, an appropriate reference level signal is set, and the mirror signal is generated in accordance with the appropriate reference level signal.

Figure 5:
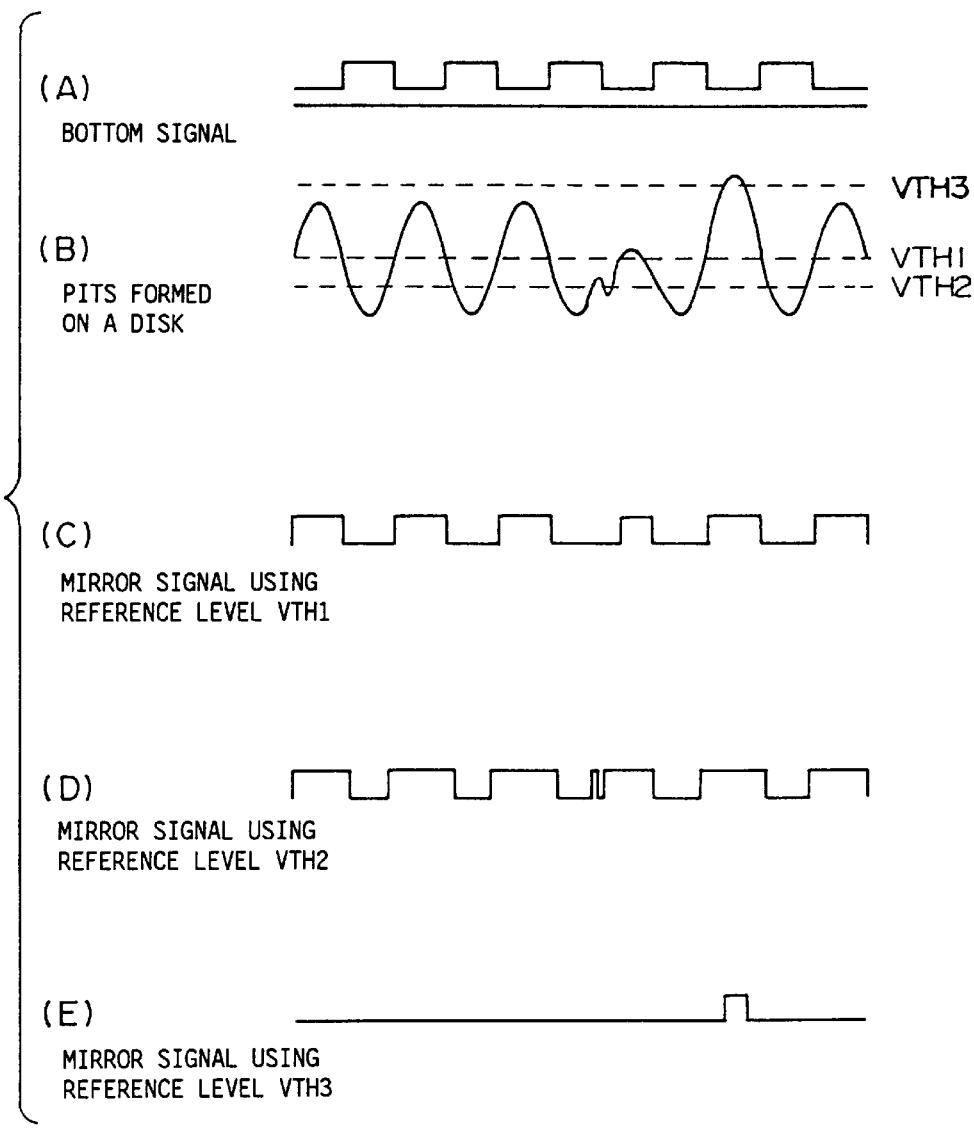
FIG. 5 is a waveform chart showing a relationship between a reference level of a comparator and a mirror signal.

A description will now be given, with reference to FIG. 5, of a change in the mirror signal due to a change in the reference level signal input to the comparator 30. FIG. 5-(A) shows pits formed on the optical disc. FIG. 5(B) shows the bottom signal generated by the mirror signal 12 shown in FIG. 4. This bottom signal corresponds to the bottom signal shown in FIG. 2-(B). That is, the bottom signal shown in FIG. 5-(B) is generated according to the optical detection signal being provided to the mirror circuit 12 via the optical detection signal processing circuit 20 when the optical pickup 10 is moved in a radial direction of the optical disc in a state in which a focus servo is turned on for adjusting a position of the optical pickup so as to follow wobbling of the optical disc.

When scanning the optical disc, the RF signal is shifted to the bottom side since an intensity of a returning light reflected by a track portion is decreased. On the other hand, since a portion between tracks is a mirror surface, the returning light is increased, and the RF signal is shifted to the peak side. The mirror signal is generated by detecting the bottom signal from the AM modulated RF signal and comparing the bottom signal with a specified reference level signal.

As shown in FIG. 5-(B), a desired mirror signal shown in FIG. 5-(C) is obtained by setting the reference level signal to a level VTH1 which is substantially the middle of the amplitude of the bottom signal. If the reference level signal is shifted down to a level VTH2 shown in FIG. 5-(B), a pulse is generated in the mirror signal since fluctuation occurs in the bottom signal due to a noise as shown in FIG. 5-(D). Therefore, the mirror signal tends to receive an influence of noise. On the other hand, if the reference level signal is raised to a level VTH3, the influence of noise can be eliminated. However, pluses may be missed (so-called missing) in the mirror signal as shown in FIG. 5-(E), and an accurate mirror signal cannot be obtained. Accordingly, it is important to set an appropriate reference level signal so as to obtain an accurate mirror signal.

A description will now be given of a method for setting the reference level control signal which sets the reference level signal.

In a first method, the reference level control signal is set according to a producing speed. In the optical disc apparatus, it is possible that an accurate mirror signal cannot be obtained when a magnitude of amplitude of the bottom signal is changed in association with a change in the reproducing speed. A description will now be given with reference to the embodiment shown in FIG. 3. The control circuit 18 provides the rotation control signal to the rotation control circuit 16 so as to control a rotational speed of the optical disc. Additionally, the control circuit 18 provides the reference level control signal to the reference level signal setting circuit 14 such as a D/A converter for outputting the reference level signal of the mirror circuit corresponding to a rotational speed of the optical disc.

The reference level control signal may be set so as to change the reference level signal according to a change in a reproducing speed such as a standard speed, a double speed or triple speed. Alternatively, the reference level control signal may be set so as to change the reference level signal according to each set of speed such as a standard speed, a set of double speed and a four-times speed or a set of eight-times speed and a ten-times speed. Additionally, the reference level control signal may be set so as to change the reference level signal based on a rotational speed of the optical disc detected by an external sensor.

In a second method, the reference level setting signal is set so as to change the reference level signal when a retry is performed when a seek error occurs. If an accurate mirror signal is not generated, a difference is generated between a travel of the optical pickup counted by a number of traverses and a target travel distance when the mirror signal is used as a traverse which is a reference of a seek operation. If this difference is large, the optical pickup cannot be moved to a position within a micro seek range in which a fine adjustment of a position of the optical pickup is performed, which results in a seek error.

Figure 6:
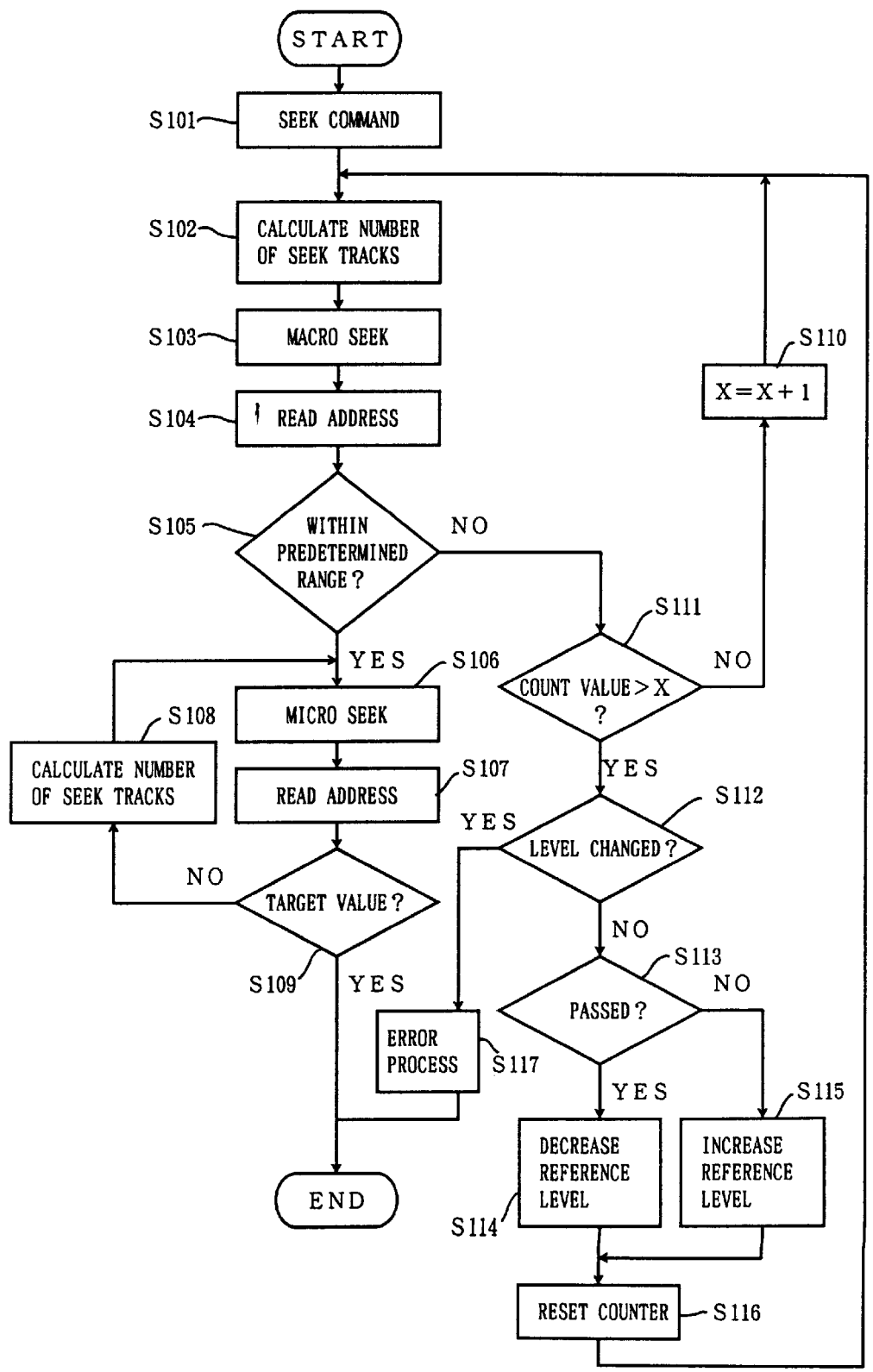
FIG. 6 is a flowchart of a process performed for retry when a seek error occurs.

Accordingly, the reference level control signal is set so as to change the reference level signal when a retry is performed when a seek error occurs. A description will now be given, with reference to FIG. 6, of a retry process when a seek error occurs. FIG. 6 is a flowchart of the retry process when a seek error occurs.

When a seek command is performed in step S101, a number of seek tracks is calculated based on the present address and a target address. Next, a macro seek is performed in step S103. The macro seek is controlled while counting a number of pulses in the mirror signal as a number of traverses. When the number of pulses in the mirror signal reaches the predetermined value calculated in step S102, the macro seek is stopped, and then an address of the optical pickup is read in step S104.

Thereafter, it is determined, in step S105, whether or not the address read in step S104 falls within a predetermined range from the target address. If it is determined that the address read in step S104 falls within the predetermined range from the target address, the routine proceeds to step S106 so as to perform a micro seek. On the other hand, if it is determined that the address read in step S104 does not fall within the predetermined range from the target address, the routine returns to step S103 so as to resume the macro seek.

When resuming the macro seek, a counter is incremented in step S110. The macro seek is repeated until the address read in step S104 falls within the predetermined range in step S105.

However, when the counter value reaches a predetermined value by repeating the macro seek process, this indicates that an accurate mirror signal has not been generated, and, thus, the reference level signal to be provided to the comparator 30 shown in FIG. 4 is changed. At this time, it is determined, in step S113, whether or not the address after the macro seek process passed the target address. If the address has passed the target address, it is expected that a large number of pulses in the mirror signal are missed which indicates that the reference level signal is at a high position as indicated by the level VTH3 shown in FIG. 5-(B). Accordingly, the routine proceeds to step S114 in which the reference level signal is shifted in a direction from the level VTH3 to the level VTH1 so as to reduce the number of missing pulses.

If the address has not reached the target address, it can be expected that a large number of error pulses are present due to detection of fluctuation in the bottom signal which indicates that the reference level signal is at a low position as indicated by the level VTH2 shown in FIG. 5-(B). Accordingly, routine proceeds to step S115 in which the reference level signal is shifted in a direction from the level VTH2 to the level VTH1 so as to reduce the number of error pulses.

It should be noted that the reference level signal may be changed in accordance with an error with respect to the predetermined range calculated in step S105. After the process of step S114 or step S115 is completed, the counter is reset in step S116, and the routine returns to step S102 so as to resume the macro seek. If it is determined, in step S105, that the address does not fall within the predetermined range, the seek operation is stopped and the routine proceeds to step S117 via step S111 and S112. In step S117, an error process is performed so as to send an error notification to a host.

It should be noted that the reference level signal may be changed further without stopping the seek operation. Additionally, the retry operation may be performed again by decreasing the rotational speed of the optical disc before sending the error notification to the host. When the rotational speed of the optical disc is reduced, the reference level signal may be changed in response to the rotational speed and also in response to an error.

In a third method, the reference level control signal is set so as to change the reference level signal based on a seek time and an ordinary time. The mirror signal is used for monitoring whether or not the optical pickup is tracing a track when a tracking is unstable in a reproducing operation immediately after completion of a seek operation. In the reproducing time, the RF signal is provided to an asymmetry circuit after AC-coupling, and an eight fourteen modulation (EFM) signal is generated in the asymmetry circuit.

Since the RF signal is AC-coupled, a bottom portion of the RF signal fluctuates due to a capacitance component. Accordingly, the reference level signal during a seek operation may be shifted in a minus direction with respect to the reference level, that is, in a direction from the level VTH1 to the level VTH2 shown in FIG. 5-(B).

In a fourth method, the reference level control signal is set so as to change the reference level signal in accordance with a type of an optical disc. Since a refractive index or a form of pits depends on a type of an optical disc such as a CD-ROM, a CD-R or an MO. Thus, amplitude of the reproduced signal varies in response to a type of an optical disc. Accordingly, a type of an optical disc is discriminated when the optical disc is inserted into the apparatus so as to set the reference level control signal for setting the reference level signal in response to each individual optical disc.

Figure 7:
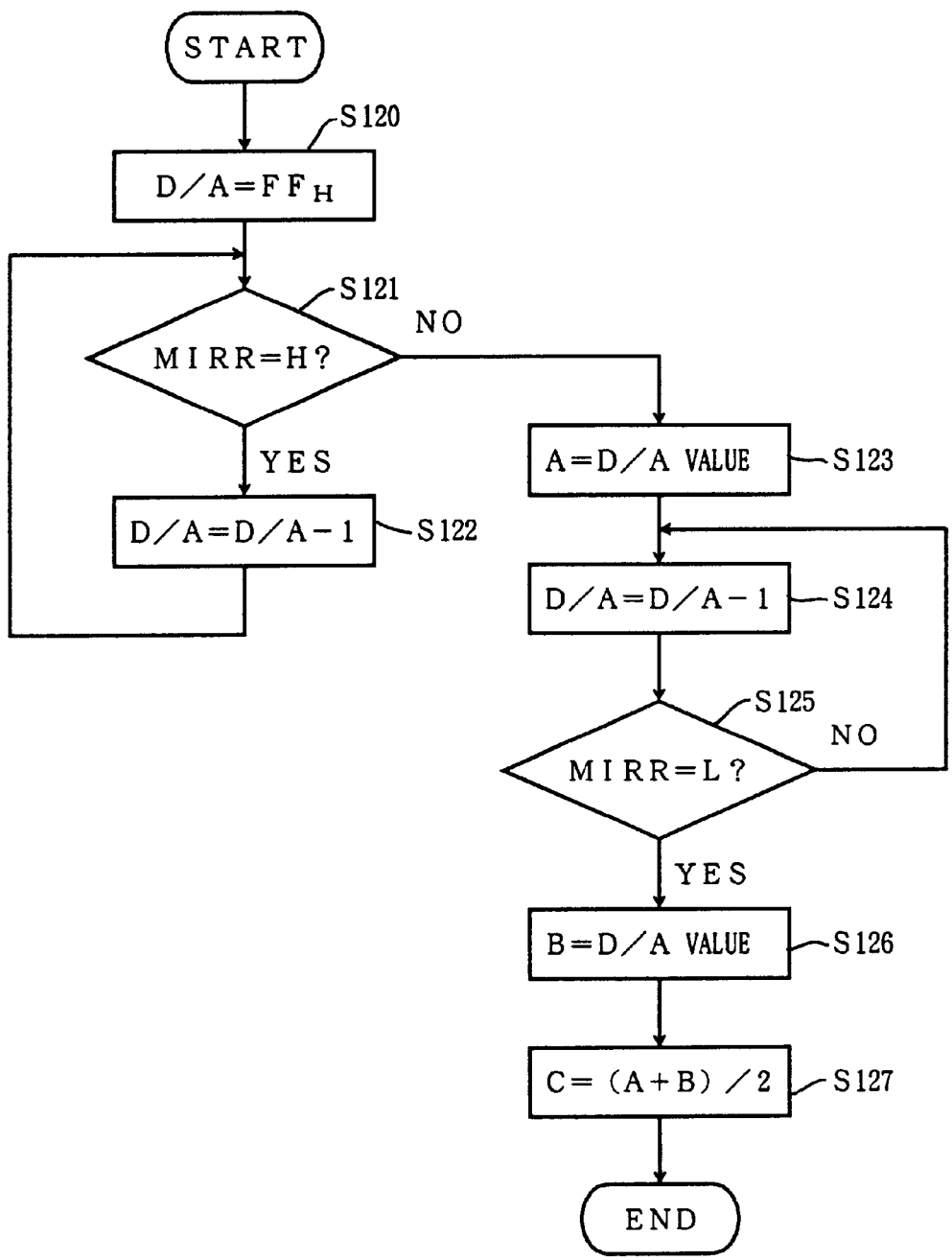
FIG. 7 is a flowchart of a process for setting a reference level control signal.

A description will now be given, with reference to FIG. 7, of a process for changing the reference level signal in response to a type of an optical disc. FIG. 7 is a flowchart of a process to set the reference level control signal for changing the reference level signal in response to a type of an optical disc.

In this process, a focus servo is turned on so as to set a disc rotation servo to a rough servo so that the mirror signal is easily output. First, in step S120, a D/A value, which is the reference level control signal, is set to the maximum value.

Referring to FIG. 5-(B), the reference level signal is set on the VTH2 side when the reference level control signal is set to the maximum value. In step S121, it is determined whether or not the Mirror signal is at a high level. If it is determined that the mirror signal is at the high level, the D/A value is decremented in step S122, and the routine returns to step S121 so as to continuously reduce the D/A value. When the D/A value is decreased, the reference level signal is increased, and, thereby, it may happen a case in which the mirror signal is not a high level. In such a case, the routine proceeds to step S123 from step S121.

In step S123, the D/A value is stored in a register A. Then, in step S124, the D/A value is decremented, and routine proceeds to step S125. It is determined, in step S125, whether or not the mirror signal is at a low level. When the reference level signal is continuously decreased, there may happen a case in which the mirror signal is maintained at the low level. In such a case, the routine proceeds to step S126 from step S125. In step S126, the D/A value is stored in a register B.

Thereafter, in step S127, a middle value between the D/A values stored in the registers A and B is calculated so as to set the calculated value to the D/A value. As mentioned above, the lower limit value and the upper limit value of the reference level signal are obtained, and the middle value between the lower limit value and the upper limit value is used as the reference level signal.

Figure 8B:
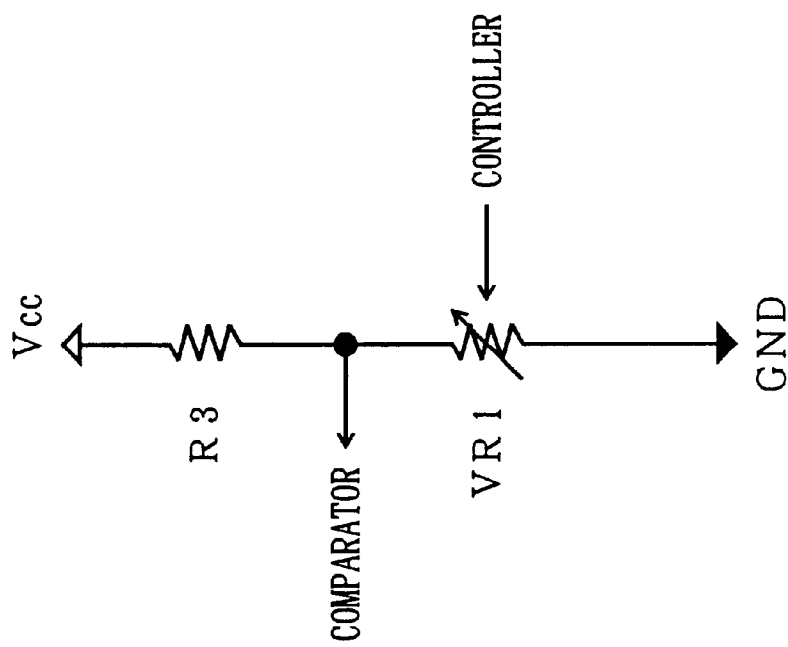
FIG. 8B is a circuit diagram of another example of the reference level setting circuit shown in FIG. 3.
Figure 8A:
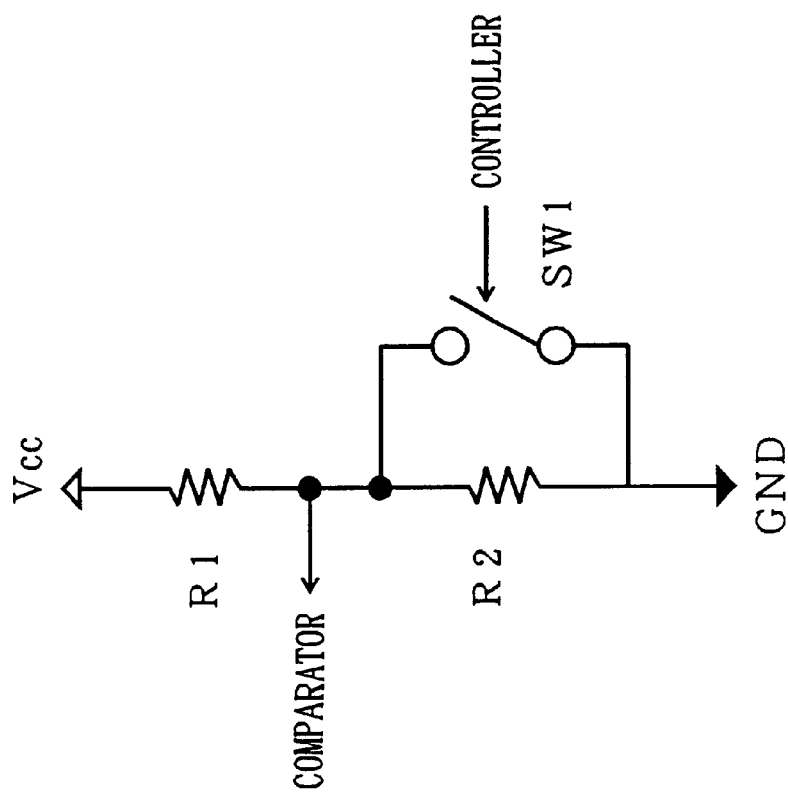
FIG. 8A is a circuit diagram of an example of a reference level signal setting circuit shown in FIG. 3.

In the above-mentioned embodiment, the reference level signal is changed by D/A-converting the reference level control signal. However, the reference level signal may be changed by using a circuit shown in FIG. 8A. In the circuit shown in FIG. 8A, resistors R1 and R2 are connected in series, and a predetermined voltage Vcc is applied across the resistors R1 and R2. A switch SW1 is provided between opposite terminals of the resistor R2 so as to change a resistance by operating the switch SW1. Alternatively, the reference signal may be changed by using a circuit shown in FIG. 8B. In the circuit shown in FIG. 8B, a resistor R3 and a variable resistor VR1 are connected in series, and a resistance of the variable resistor VR1 is changed according to the reference level control signal.

Additionally, in the above-mentioned embodiment, although the reference level signal is set only by the external signal, the present invention is not limited to this and is applicable to a mirror circuit having a structure in which the level signal is set by itself by smoothing an envelope of the reproduced RF signal. That is, there may be a case in which a ratio of the reference level to amplitude of the envelope is preferably set individually for each of different media. In such a case, an accurate mirror signal can be generated by adding the structure according to the present invention.

The present invention is not limited to the specifically disclosed embodiments, and variations and modifications may be made without departing from the scope of the present invention.

The present application is based on Japanese priority application No. 9-313598 filed on Nov. 14, 1997, the entire contents of which are hereby incorporated by reference.

What is claimed is:

1. An optical disc apparatus to enable reproduction of information recorded on an optical disc, comprising:

a mirror circuit generating a mirror signal by comparing a level of a bottom signal with a level of a reference level signal, the bottom signal being detected from a reflection signal obtained by optically scanning said optical disc;

a reference level control circuit, operatively coupled to said mirror circuit, for generating a reference level control signal; and a reference level signal setting circuit, operatively coupled to said mirror circuit and said reference level control circuit, for setting said level of said reference level signal in accordance with the reference level control signal.

2. The optical disc apparatus of claim 1, wherein said reference level control circuit generates the reference level control signal in accordance with a reproducing speed of the information on said optical disc.

3. The optical disc apparatus of claim 1, wherein said reference level control circuit generates the reference level control signal when a retry of a seek operation is performed due to an occurrence of a seek error.

4. The optical disc apparatus of claim 1, wherein said reference level control circuit generates the reference level control signal so that a level of said reference level signal generated when a seek operation is performed is changed from that generated when an ordinary reproducing operation is performed.

5. The optical disc apparatus of claim 1, wherein said reference level control circuit generates the reference level control signal for setting the reference level signal in accordance with a type of said optical disc when an operation of said optical disc apparatus is started.

* * * * *